Dec. 3, 1935.   G. E. LE COUNT   2,023,235
SPRING DRIVE
Filed June 1, 1934
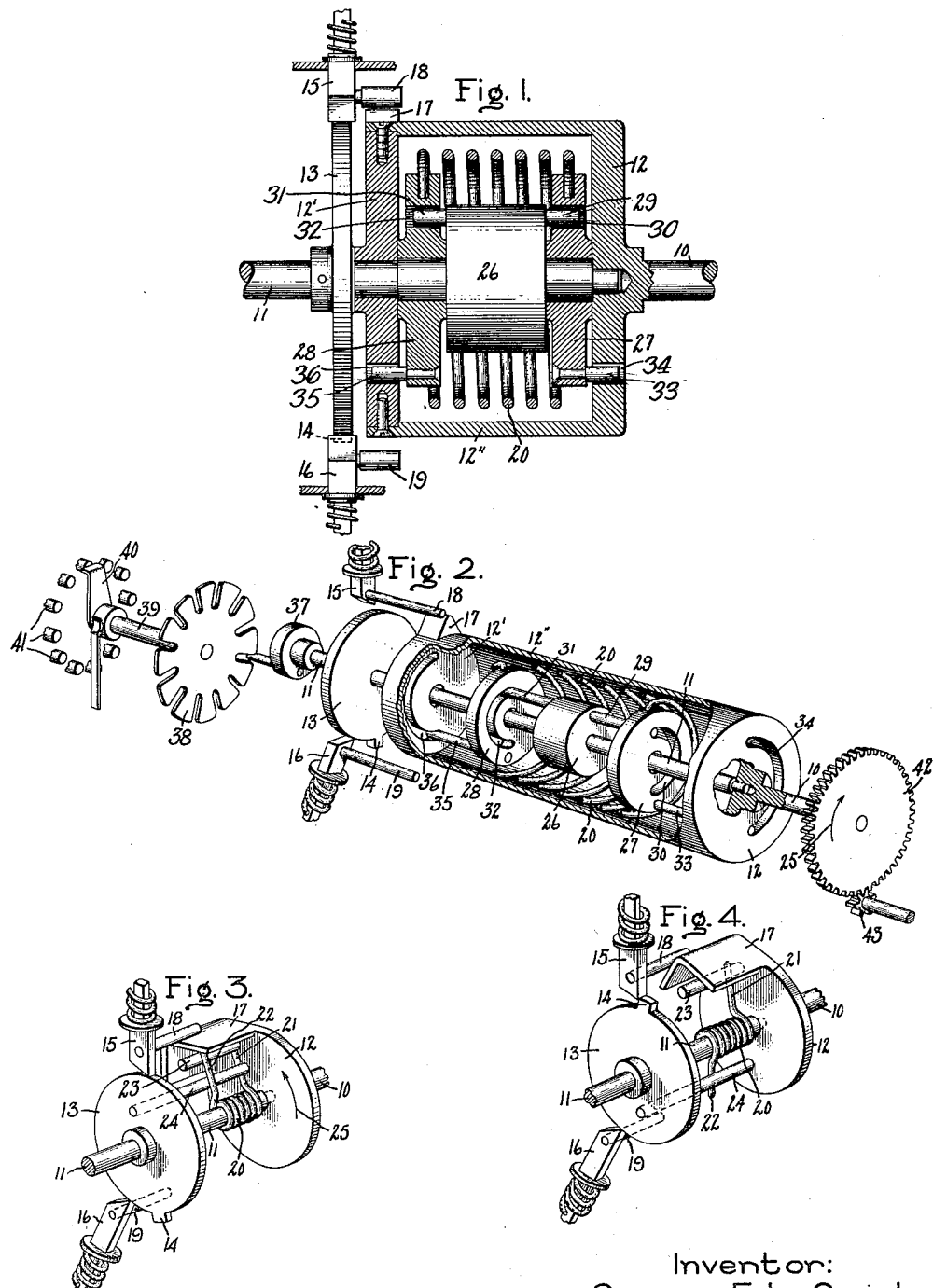
Inventor:
George E. LeCount,
by Harry E. Dunham,
His Attorney.

Patented Dec. 3, 1935

2,023,235

UNITED STATES PATENT OFFICE 2,023,235

SPRING DRIVE

George E. Le Count, Pittsfield, Mass., assignor to General Electric Company, a corporation of New York Application June 1, 1934, Serial No. 728,486

1 Claim. (Cl. 185—37)

My invention relates to spring drives. In the operation of valves, switches and some other devices, it is sometimes desired that an intermittently driven device be operated very quickly by some driving device which operates and moves much more slowly. The general object of the present invention is to provide an improved construction and arrangement of spring drive of this general type of which an example is disclosed in my United States Letters Patent No. 1,891,101, issued December 13, 1932.

Other objects and advantages will be explained in the following description taken in connection with the accompanying drawing in which Fig. 1 is a longitudinal sectional view of a preferred form of spring drive constructed in accordance with the invention; Fig. 2 is a diagrammatic perspective view of the spring drive, parts being broken away to reveal details and the drive being shown as applied in the operation of an electric switch; and Figs. 3 and 4 are perspective views of a simplified form of the invention.

Like reference characters indicate similar parts in the different figures of the drawing.

The simplified form of the invention shown in Figs. 3 and 4, which will be first described, includes two shafts 10 and 11 aligned along a common axis, the shaft 10 being a driving shaft which may be rotated in either direction by any suitable source of power and the shaft 11 being a driven shaft which may be connected to any load which the spring drive is adapted to operate. Disks 12 and 13 are secured to the shafts 10 and 11 respectively. The disk 13 on the driven shaft 11 has a projection or tooth 14 on its outer edge and two spring latches or stops 15 and 16 are spaced about the periphery of this disk and normally held in the path of the tooth 14. The end of each of the stops 15 and 16 is beveled so that it will yield and permit rotation of the driven shaft 11 in one direction but will prevent its rotation in the other direction. The stop 15 is beveled to prevent rotation of the driven shaft 11 only in one direction and the stop 16 is oppositely beveled to prevent rotation of the driven shaft only in the other direction. A cam 17 on the disk 12 is arranged to strike pins 18 and 19 on the stops 15 and 16 respectively and lift each stop out of the path of the tooth 14 as the cam passes the stop. A helical spring 20 surrounding the shaft 11 has its two ends 21 and 22 projecting radially at opposite sides of two pins 23 and 24 fixed respectively to the two disks 12 and 13. The spring 20 is preferably normally under some tension so that it tends to hold the two pins 23 and 24 in the same radial position as shown in Fig. 3.

The spring drive which has been described is operated by rotating the driving shaft 10. Assume that the shaft 10 is rotated in the direction of the arrow 25 with the parts starting from the positions indicated in Fig. 3. This will rotate the disk 12 with its cam 17 and pin 23 which will act through the spring 20, the pin 24 and the disk 13 to rotate the driven shaft in the same direction so long as the driven shaft is free to rotate. When the tooth 14 reaches the stop 15 as shown in Fig. 4, further rotation of the driven shaft 11 is prevented. The pin 24 is also stopped and holds the end 22 of the spring 20 while the pin 23 continues to move the other end 21 of the spring and increase its tension. Finally, the cam 17 reaches the pin 18, as shown in Fig. 4, and pushes back the stop 15 to release the tooth 14 so that the driven shaft 11 is free to rotate. As soon as the tooth 14 is released, the driven shaft 11 is rotated rapidly by the spring 20 until the two pins 23 and 24 are again together as shown in Fig. 3. Just as the pin 24 reaches the other pin 23, the end 22 of the spring 20 is stopped by the pin 23. The pin 24 with its disk 13 and the driven shaft 11 is stopped at the same time by the end 21 of the spring. The driven shaft 11 and the parts which rotate with it may have considerable inertia but they are stopped without serious shock because of the resiliency of the spring 20. If the driving shaft 10 continues to rotate in the direction of the arrow 25, the action which has been described will be repeated.

The spring drive which has been described may be operated in either direction. If the driving shaft 10 is rotated in a direction against the arrow 25, the driven shaft 11 will rotate with the driving shaft until the tooth 14 and the driven shaft are stopped by the latch 16. The spring 20 is then tensioned by the pin 23 until the cam 17 pushes back the latch 16 and releases the tooth 14. The driven shaft 11 is then free and is rotated rapidly through part of a revolution by the spring 20, the driven shaft being stopped without serious shock by the resilient end 22 of the spring.

The preferred form of the invention is shown in Fig. 1 and the explanatory view in Fig. 2 shows the same form but with the parts separated to indicate the construction more clearly. This preferred form of the invention includes a driving shaft 10 and a driven shaft 11. A disk 12' rotatable on the driven shaft 11 and a disk 12 rigidly mounted on the driving shaft 10 are rigidly connected by a cylinder 12" to form a casing. The driving shaft 10 and the driven shaft 11 are relatively rotatable about a common axis. A disk 26 is fixed to the driven shaft 11 between two disks 27 and 28 which are rotatable on the driven shaft. A pin 29 on the disk 26 extends into a groove 30 in the disk 27 and a pin 31 on the disk 26 extends into a groove 32 in the disk 28, the grooves 30 and 32 being concentric with the common axis of the disks. A helical spring 20 is connected between the two disks 27 and 28 and constantly tends to rotate these two disks in opposite direction relatively to each other so that each of these disks is normally held with one end of its groove pressed against its respective pin but with the grooves extending around the driven shaft 11 in opposite direction from their pins. A pin 33 on the disk 27 extends into one end of a groove 34 in the disk 12 and a pin 35 on the disk 28 extends into one end of a groove 36 in the disk 12', the grooves 34 and 36 extending concentrically about the common axis of the disks and in opposite directions from their respective pins.

A disk 13 having a tooth or projection 14 is mounted rigidly on the driven shaft 11 and two one-way spring-pressed latches or stops 15 and 16 are arranged in the path of the tooth 14. The stop 15 has a pin 18 which may be engaged by a cam 17 on the cylinder 12". The stop 16 has a similar pin 19 which may also be engaged by the cam 17.

As an example of one possible use of the application of the spring drive which has been described, the driven shaft 11 is shown in Fig. 2 connected to a Geneva gear including a driving member 37 and a gear wheel 38, the gear wheel 38 being connected by a shaft 39 to a switch contact 40 which is movable over a plurality of fixed contacts 41. The driving shaft 10 may be rotated in any desired manner as by the gear wheels 42 and 43.

The driven shaft 11 may be rotated in either direction desired by rotating the driving shaft 10 in the corresponding direction. Suppose the driving shaft 10 to be rotated in the direction of the arrow 25. As the driving shaft starts to rotate, the driven shaft 11 will rotate with it until the tooth 14 reaches the stop 16, the driving shaft being yieldingly connected to the driven shaft by the disk 12, cylinder 12", disk 12', pin 35, disk 28, spring 20, disk 27, pin 29 and disk 26. When the tooth 14 reaches the stop 16, the driven shaft 11 with its disk 26 and pin 29 can no longer rotate. The pin 29 thus holds the disk 27 and its end of the spring 20 from further rotation. The disk 12' then acts through the pin 35 and the disk 28 to increase the tension of the spring until the cam 17 reaches the pin 19 and pushes back the stop 16 to release the tooth 14. The tension of the spring on the disk 27 then acts through the pin 29 and the disk 26 to rotate the driven shaft rapidly through part of a revolution and consequently to rotate the movable switch contact 40 to the next fixed contact 41. While the spring was being tensioned, the disk 28 was rotated to carry its groove 32 to the other side of the pin 31 from that shown in Fig. 2. After the spring was tensioned and the tooth 14 was released by the cam 17, the rapid rotation of the driven shaft carried the pin 31 along its groove 32 until it and the driven shaft were stopped by the opposite end of the groove. The driven shaft is stopped, however, without any serious shock because of the resiliency of the spring 20 connected to the disk 28.

If the driving shaft 10 is rotated in the direction against the arrow 25, then the driven shaft 11 will rotate with it until the tooth 14 reaches the stop 15. The disk 12 on the driving shaft 10 then acts through the pin 33 and the disk 27 to tension the spring, the opposite end of the spring being held from rotation by the disk 28, the pin 31 and the disk 26 on the driven shaft. When the cam 17 reaches the pin 18, the stop 15 is pushed back and the tooth 14 with the driven shaft released. The spring 20 then acts through the disk 28, pin 31 and the disk 26 to rotate the driven shaft 11 rapidly until the pin 29 is stopped by the end of the groove 30 in the disk 27, the driven shaft being stopped without any serious shock because of the resiliency of the spring 20. The driven shaft 11 may thus be rotated rapidly through part of a revolution any number of times and in either direction desired by rotating the driving shaft 10 in the desired direction.

The invention has been explained by describing and illustrating different forms and a possible application thereof but it will be apparent that changes may be made without departing from the spirit of the invention and the scope of the appended claim.

What I claim as new and desire to secure by Letters Patent of the United States, is,—

A spring drive including axially alined driving and driven shafts, a helical spring surrounding the common axis of said shafts, means controlled by the driving shaft for tensioning the spring from either end, means controlled by the driven shaft for holding either end of the spring while it is being tensioned from the other end, there being a lost motion connection between said holding means and each end of the spring, and means for automatically releasing the driven shaft after the spring has been tensioned, said driven shaft being free to rotate when released until stopped by one of said lost motion connections.

GEORGE E. LE COUNT.